(12) United States Patent
Easey et al.

(10) Patent No.: US 11,041,746 B2
(45) Date of Patent: Jun. 22, 2021

(54) FLOW DETERMINATION

(71) Applicant: CENTRICA HIVE LIMITED, Windsor (GB)

(72) Inventors: Peter Easey, Windsor (GB); David Griffin, Windsor (GB)

(73) Assignee: CENTRICA HIVE LIMITED, Windsor (GB)

( * ) Notice: Subject to any disclaimer, the term of this patent is extended or adjusted under 35 U.S.C. 154(b) by 187 days.

(21) Appl. No.: 16/315,595

(22) PCT Filed: Jul. 4, 2017

(86) PCT No.: PCT/GB2017/051970
§ 371 (c)(1),
(2) Date: Jan. 4, 2019

(87) PCT Pub. No.: WO2018/007802
PCT Pub. Date: Jan. 11, 2018

(65) Prior Publication Data
US 2019/0310119 A1    Oct. 10, 2019

(30) Foreign Application Priority Data

Jul. 4, 2016 (GB) .................................. 1611632
Aug. 11, 2016 (GB) .................................. 1613812

(51) Int. Cl.
*G01F 1/68* (2006.01)
*G01K 13/02* (2021.01)
(Continued)

(52) U.S. Cl.
CPC .................................. *G01F 1/6847* (2013.01)

(58) Field of Classification Search
CPC . G01F 1/68–688; G01F 1/6847; G01K 13/02; G01M 3/00; G01M 3/26; G01M 3/28
See application file for complete search history.

(56) References Cited

U.S. PATENT DOCUMENTS 10,508,966 B2 * 12/2019 Tooms ................ G01M 3/2807
2004/0225458 A1    11/2004 Sherikar
(Continued)

FOREIGN PATENT DOCUMENTS

DE       19858307 A1      6/2000
JP       58086417 A  *    5/1983   ............... G01F 1/68
WO    WO 01/25743 A2     4/2001

OTHER PUBLICATIONS

PCT International Search Report, PCT Application No. PCT/GB2017/051970, dated Nov. 20, 2017, 16 pages.
(Continued)

*Primary Examiner* — Nguyen Q. Ha
(74) *Attorney, Agent, or Firm* — Fenwick & West LLP

(57) ABSTRACT

A method and apparatus for making a flow determination with respect to a flow through a fluid conduit is described. The apparatus comprises a first temperature sensor arranged to generate a temperature signal indicative of the temperature of the outer surface of the fluid conduit, a second temperature sensor arranged to generate a temperature signal indicative of the ambient temperature outside of the fluid conduit; and a processor arranged to make the flow determination. The flow determination is made by determining the first and second temperatures at a first time; predicting a predicted first temperature at a second time; determining the first temperature at the second time; and comparing the predicted first temperature with the determined first temperature at the second time.

20 Claims, 5 Drawing Sheets

(51) Int. Cl.
*G01M 3/00* (2006.01)
*G01F 1/684* (2006.01)

(56) References Cited

U.S. PATENT DOCUMENTS

2013/0276549 A1   10/2013   Gaarder
2018/0313714 A1*  11/2018   Bailey .................... G01K 1/143
2019/0128762 A1*   5/2019   Bailey .................... G01K 1/143

OTHER PUBLICATIONS

PCT Invitation to Pay Additional Fees, PCT Application No. PCT/GB2017/051970, dated Sep. 26, 2017, 10 pages.

* cited by examiner

FLOW DETERMINATION

RELATED APPLICATIONS

This application is a 35 U.S.C. 371 national stage filing of International Application No. PCT/GB2017/051970 filed on Jul. 4, 2017, which claims priority from United Kingdom Application No. GB1611632.9 filed on Jul. 4, 2016 and United Kingdom Application No. GB1613812.5 filed on Aug. 11, 2016. The contents of the aforementioned applications are hereby incorporated by reference in their entireties.

This invention relates to a method and apparatus for flow determination and analysis, a fluid conduit provided with such an apparatus, a sensing apparatus and a related kit of parts.

For various reasons, in particular in order to prevent or mitigate the damage caused by leaking pipes, it is desirable to be able to determine whether and to what extent a fluid, and typically water, is flowing through a fluid conduit such as a pipe. Given the extent of extant plumbing networks, it is desirable to provide a solution to this problem that is non-invasive, simple and easily installed.

We are aware of the PCT application published as WO01/25743, which discloses a flow sensor which determines whether there is flow through a pipe if the temperature of the pipe is different from ambient temperature by more than a predetermined limit for more than a predetermined period of time. However, this is relatively inflexible in that it requires the predetermined period of time to have elapsed before a determination is made, and no measurement of the level of flow is provided.

According to a first aspect of the invention, there is provided an apparatus for making a flow determination with respect to a flow through a fluid conduit, the fluid conduit comprising a wall having an inner surface surrounding a flow space through which the fluid flows and an outer surface, the apparatus comprising:
- a first temperature sensor arranged to be mounted on the outer surface of the fluid conduit and arranged to generate a first temperature signal indicative of a first temperature being the temperature of the outer surface;
- a second temperature sensor arranged to be positioned spaced apart from the first temperature sensor and to generate a second temperature signal indicative of a second temperature being the ambient temperature outside of the fluid conduit; and
- a processor having inputs for the first and second temperature signals;

in which the processor has an output for the flow determination and is arranged to make the flow determination by:
- determining the first and second temperatures at a first time;
- using the first and second temperatures at the first time, predicting a predicted first temperature representative of the first temperature at a second time later than the first time;
- determining the first temperature at the second time;
- comparing the predicted first temperature with the determined first temperature at the second time; and
- making the flow determination dependent upon the comparison.

As such, the temperature of the fluid conduit and the ambient temperature can be used to predict the temperature of the fluid conduit at a later time and then compared with the actual temperature at that later time in order to make a flow determination. This can potentially be quicker and more reliable than simply determining that there is flow dependent upon the difference between the temperatures being more than a threshold.

The processor may be arranged to compare the predicted first temperature with the determined first temperature by determining whether the determined first temperature at the second time is at least one of closer to the second temperature than the predicted first temperature, further from the second temperature than the predicted first temperature, or equal to the predicted first temperature. If the determined first temperature is closer to the second temperature than the prediction, there is likely to be less flow than the predicted first temperature indicates; if the determined first temperature is further from the second temperature than the prediction, then there is likely to be more flow. If the predicted and determined first temperatures are equal, then the flows represented by each will be the same.

Typically, the predicted first temperature will represent the zero flow state (e.g. zero flow through the fluid conduit), in which case it is likely that the processor will only consider whether the determined first temperature is further from the second temperature than the predicted first temperature or equal to the predicted first temperature.

The processor may be arranged to determine the magnitude of the difference between the predicted and determined first temperature, which may be indicative of the levels of flow.

The apparatus may comprise a memory holding an expected convergence curve. The memory may hold at least one expected convergence curve; where there is a plurality of expected convergence curves, they may relate to fluid conduits of different sizes and materials. Typically, each expected convergence curve may correspond to a model (typically theoretical and/or computational) which assumes no flow in the fluid conduit. The model may assume that the difference between the first and second temperatures will decay exponentially, or a numerical approximation to an exponential decay. Alternatively, the processor may be arranged to determine the expected convergence curve and typically to store it in the memory by recording the temperature of the fluid conduit over a period of time when there is known to be no flow, but that starts at a point where the temperature of the fluid conduit and the ambient temperature is different (for example, when there has been a recent flow).

We have found that the above method gives good useful results quickly.

The apparatus may comprise a housing in which the first and second temperature sensors are mounted. The housing may support the first temperature sensor against the fluid conduit.

The housing may be provided with thermal insulation, such as an insulating foam, which separates the first temperature sensor on the one hand from the second temperature sensor on the other hand. Typically, moving away from the fluid conduit, the housing may be arranged in the order first temperature sensor, thermal insulation, second temperature sensor.

The processor will typically be located spaced apart from the housing and/or the first and second temperature sensors, or may be located with the housing and/or the first and second temperature sensors, or may be distributed between different locations. As such, the apparatus may comprise a transmitting unit which is arranged to transmit the first and second (and third if present) temperature signals or the flow determination to a remote location, potentially containing the processor or a remote part thereof. The transmitting unit may, for example, be a Bluetooth® Low Energy transceiver, or any other suitable wireless transmitter. However, the transmitting unit may transmit the first and second temperature signals or the flow determination over wires, or the processor can be located with the first and second temperature sensors, possibly in the housing.

In the preferred embodiment of the invention, the processor or remote location comprises a mobile telecommunications device, such as a mobile telephone. As such, the functions of the processor may be carried out by an application of the mobile telecommunications device. Alternatively or additionally, the processor or remote location may comprise a hub, which is arranged to receive signals from multiple sets of first and second temperature sensors.

According to a second aspect of the invention, there is provided a fluid conduit fitted with the apparatus of the first aspect of the invention.

The fluid conduit may be a pipe; typically, the fluid will be a liquid such as water, although this invention can be used with any fluid flow. Typically, the plumbing network is a domestic clean water installation, although it may be used with commercial or industrial situations or for domestic (or otherwise) sewage installations.

According to a third aspect of the invention, there is provided a method of making a flow determination with respect to a flow through a fluid conduit, the fluid conduit comprising a wall having an inner surface surrounding a flow space through which the fluid flows and an outer surface, the method comprising:
  measuring, at a first time, a first temperature being the temperature of the outer surface;
  measuring, at the first time, a second temperature being the ambient temperature outside of the fluid conduit;
  using the first and second temperatures at the first time, predicting a predicted first temperature representative of the first temperature at a second time later than the first time;
  measuring the first temperature at the second time;
  comparing the predicted first temperature with the measured first temperature at the second time; and
  making the flow determination dependent upon the comparison.

As such, the temperature of the fluid conduit and the ambient temperature can be used to predict the temperature of the fluid conduit at a later time and then compared with the actual temperature at that later time in order to make a flow determination. This can potentially be quicker and more reliable than simply determining that there is flow dependent upon the difference between the temperatures being more than a threshold.

The comparison may comprise determining whether the determined first temperature at the second time is at least one of closer to the second temperature than the predicted first temperature, further from the second temperature than the predicted first temperature, or equal to the predicted first temperature. If the determined first temperature is closer to the second temperature than the prediction, there is likely to be less flow than the predicted first temperature indicates; if the determined first temperature is further from the second temperature than the prediction, then there is likely to be more flow. If the predicted and determined first temperatures are equal, then the flows represented by each will be the same.

Typically, the predicted first temperature will represent the zero flow state, in which case it is likely that the processor will only consider whether the determined first temperature is further from the second temperature than the predicted first temperature or equal to the predicted first temperature.

The method may comprise determining the magnitude of the difference between the predicted and determined first temperature, which may be indicative of the levels of flow.

The prediction may comprise using an expected convergence curve. The prediction may comprise selecting from a plurality of expected convergence curves, which may relate to fluid conduits of different sizes and materials. Typically, each expected convergence curve may correspond to a model (typically theoretical and/or computational) which assumes no flow in the fluid conduit. The model may assume that the difference between the first and second temperatures will decay exponentially, or a numerical approximation to an exponential decay.

We have found that the above method gives good useful results quickly.

According to a fourth aspect of the invention, there is provided a sensing apparatus, comprising:
  a first temperature sensor;
  a sensor head housing the first temperature sensor, the sensor head being arranged so as to hold the first temperature sensor against a fluid conduit, with the first temperature sensor being arranged so as to produce in use a first temperature signal indicative of a first temperature being that of the fluid conduit;
  a second temperature sensor, arranged to produce in use a second temperature signal indicative of a second temperature being the ambient temperature;
in which the sensor head comprises a engagement portion arranged to engage the fluid conduit to retain the fluid conduit, in which the engagement portion has three contact positions circumferentially around the fluid conduit and does not otherwise contact the fluid conduit.

As such, this allows more convenient installation on a fluid conduit; the engagement portion engages onto the fluid conduit but only at three positions, thus maximising thermal isolation, and therefore allowing the temperature sensors to more accurate measure their respective temperatures. As such, this will allow the apparatus to comprise a housing (e.g. a second temperature sensor housing) coupled to the sensor head and containing the second temperature sensor as the measurement of the second temperature will therefore be less susceptible to interference from the fluid conduit temperature.

The engagement portion may comprise a pair of arcuate jaws. The engagement portion may comprise a biasing member arranged to bias at least one of the contact positions into contact with the fluid conduit.

The first temperature sensor may be provided with a sensor biasing member, which tends to bias the first temperature sensor into contact with the fluid conduit in use.

The first temperature sensor may be mounted in the sensor head using a coupling which can be repeatedly released and engaged. This allows for a single first temperature sensor (a relatively high cost component) to be used with multiple different sensor heads (typically a lower cost component).

The apparatus may define an air gap between the engagement portion and/or the sensor head on the one hand, and the first temperature sensor on the other hand. This may improve the thermal isolation of the first temperature sensor from the sensor head.

According to a fifth aspect of the invention, there is provided a fluid conduit fitted with the apparatus of the fourth aspect of the invention.

Typically, the fluid conduit will have a circumference, and the apparatus will only contact the fluid conduit at the contact positions. The engagement portion may define an air gap between the fluid conduit and the apparatus.

According to a sixth aspect of the invention, there is provided a kit of parts, comprising:
- a first temperature sensor;
- a plurality of sensor heads arranged to house the first temperature sensor, each sensor head being arranged so as to hold the first temperature sensor against a fluid conduit, with the first temperature sensor being arranged so as to produce in use a first temperature signal indicative of a first temperature being that of the fluid conduit;
- a second temperature sensor, optionally in a housing, arranged to produce in use a second temperature signal indicative of a second temperature being the ambient temperature, optionally around the housing;

in which the sensor head comprises an engagement portion arranged to engage the fluid conduit to retain the fluid conduit, in which the engagement portion has three contact positions circumferentially around the fluid conduit and does not otherwise contact the fluid conduit and in which the sensor heads can interchangeably engage the first temperature sensor.

Thus, this allows an installer to pick from several sensor heads relating to different pipes, using the same first temperature sensor.

The kit of parts may have any of the optional features of the fourth aspect of the invention.

According to a seventh aspect of the invention, there is provided an apparatus for analysing flow through a fluid conduit, the fluid conduit comprising a wall having an inner surface surrounding a flow space through which the fluid flows and an outer surface, the apparatus comprising:
- a first temperature sensor arranged to be mounted on the outer surface of the fluid conduit, to measure a first temperature being the temperature of the outer surface and to generate a first temperature signal indicative of the first temperature;
- a second temperature sensor arranged to be positioned spaced apart from the first temperature sensor, to measure a second temperature being the ambient temperature outside of the fluid conduit and to generate a second temperature signal indicative of the second temperature; and
- a processor having inputs for the first and second temperature signals, the processor arranged to record the first and second temperatures over a period of time to form temperature data;

in which the processor has an output for the flow determination and is arranged to categorise temporal subsets of the temperature data as, for each temporal subset:
- stable convergence if a difference between the first and second temperatures over the temporal subset is less than a first convergence threshold and the difference is stable over the temporal subset within a stability threshold;
- stable non-convergence if the difference is stable over the temporal subset within the first stability threshold, but the difference is greater than the convergence threshold;
- usage if at least one of the following criteria is met:
  - the first temperature is changing rapidly within the temporal subset away from the second temperature; and
  - the first temperature diverging from the second temperature so that the first temperature crosses a usage threshold;
- predicted convergence if a model of the first temperature over the temporal subset indicates that the first and second temperatures would converge to within a second convergence threshold; and
- predicted non-convergence if the model indicates that the difference first and second temperatures would stabilise at a value larger than the second convergence threshold;

in which stable convergence and predicted non-convergence indicate no flow in the conduit, and usage, stable non-convergence and predicted non-convergence indicate flow in the conduit.

As such, this approach to analysing flow in the conduit allows for speedy consideration of whether the pipe and ambient (first and second) temperatures are converging; it combines a determination of what is occurring in the time period (temporal subset) if an immediate determination can be made (the non-predicted categories) with a prediction based on what the temperatures are currently doing. As such, the combination of predicted and non-predicted categories allow for more datasets to be categorised (as the predicted categories can categorise temporal subsets that would not be categorisable by the non-predicted categories) but allowing for the simplicity of calculation involved with the non-predicted categories. Typically, a categorisation of usage will indicate a higher flow rate in the conduit than the stable or predicted non-convergence.

Typically, the processor will be arranged so that, for a given temporal subset, it will only calculate the model if the temporal subset is not categorised as stable convergence, stable non-convergence or usage. Thus, the more complicated calculations need only be carried out if the simple non-predicted categories do not successfully categorise the temporal subset.

The processor may be arranged to determine that the first temperature is changing rapidly within the temporal subset away from the second temperature if the rate at which the first temperature is changing is greater than a divergence threshold. The divergence threshold may be a predetermined value, or the processor may be arranged to determine the divergence threshold as a proportion of the span between a lowest observed temperature over an observation window and the second temperature. The processor may be arranged to determine a flow level by determining the rate of change of the first temperature away from the second temperature as a proportion of the span.

The processor may be arranged so as to determine a fluid temperature. Typically, this would be the lowest first temperature recorded over a window period. Typically, the window period could be at least 12, but preferably at least 18 or 24 hours. The processor may be arranged to determine the usage threshold as the fluid temperature shifted by a temperature shift towards the pipe temperature. As such, in effect, usage is determined on the usage threshold basis if the pipe temperature is within the temperature shift of the fluid temperature.

The processor may be arranged so that if a temporal subset is determined as usage, it cannot also be determined as any other category.

The processor may be arranged to model the first temperature by modelling the rate of change of the first temperature with time; as such, the rate of change of the first temperature may comprise a first component which is proportional to the difference between the first and second temperatures and has a first proportionality constant, and a second component which is proportional to the difference between the first temperature and a fluid temperature, being the temperature of a fluid in the fluid conduit, and has a second proportionality constant. The processor may also be arranged so as to model the first temperature by determining the first and second proportionality constants so that the modelled rate of change fits the measured first temperature over the temporal subset.

The first proportionality constant may represent characteristics of the installation of the apparatus and so may be unlikely to vary; the second proportionality constant may vary depending on the level of flow through the conduit. The processor may be arranged to categorise each temporal subset based upon a ratio of the first and second proportionality constants; the smaller the second proportionality constant is relative to the first proportionality constant, the lower the flow. Typically, the processor may be arranged to categorise a temporal subset as predicted convergence if the ratio is above a gain threshold.

The processor may also determine the goodness of fit of the model to the temperature data in each temporal subset. The processor may only categorise a temporal subset as predicted convergence or predicted non-convergence if the goodness of fit is greater than a fitness threshold. If it is not, and the temporal subset is not otherwise categorised, the processor may be arranged to categorise the temporal subset as undetermined.

We have found that the above method gives good results even when actual convergence is not seen, and can give useful results more quickly. In particular, it is useful in cases where the first temperature converges to a temperature between the first second and fluid temperatures; this is indicative of a flow, but where the first and second components are equal.

The apparatus may comprise a housing in which the first and second temperature sensors are mounted. The housing may support the first temperature sensor against the fluid conduit. The housing may also support the second temperature sensor spaced away from the first temperature sensor.

The housing may comprise a thermal mass, such as a metallic body, which holds the first temperature sensor against the fluid conduit. A third temperature sensor may be provided on the thermal mass on an opposite face of the thermal mass to the first temperature sensor; this may provide the third temperature sensor's slower temporal response.

The housing may be provided with thermal insulation, such as an insulating foam, which separates the first temperature sensor (and the third temperature sensor) on the one hand from the second temperature sensor on the other hand. Typically, moving away from the fluid conduit, the housing may be arranged in the order first temperature sensor, thermal mass, (third temperature sensor if provided), thermal insulation, second temperature sensor.

The processor will typically be located spaced apart from the housing and/or the first and second temperature sensors, or may be located with the housing and/or the first and second temperature sensors, or may be distributed between different locations. As such, the apparatus may comprise a transmitting unit which is arranged to transmit the first and second (and third if present) temperature signals or the flow determination to a remote location, potentially containing the processor or a remote part thereof. The transmitting unit may be, for example, be a Bluetooth® Low Energy transceiver, or any other suitable wireless transmitter. However, the transmitting unit may transmit the first and second temperature signals or the flow determination over wires, or the processor can be located with the first and second temperature sensors, possibly in the housing.

In the preferred embodiment of the invention, the processor or remote location comprises a mobile telecommunications device, such as a mobile telephone. As such, the functions of the processor may be carried out by an application of the mobile telecommunications device. Alternatively or additionally, the processor or remote location may comprise a hub, which is arranged to receive signals from multiple sets of first and second temperature sensors.

The flow determination may comprise a binary measure of whether the fluid is flowing. Alternatively, the flow determination may comprise an indication of a flow rate of the fluid in the fluid conduit.

According to an eighth aspect of the invention, there is provided a fluid conduit fitted with the apparatus of the seventh aspect of the invention.

The fluid conduit may be a pipe; typically, the fluid will be a liquid such as water, although this invention can be used with any fluid flow. Typically, the plumbing network is a domestic clean water installation, although it may be used with commercial or industrial situations or for domestic (or otherwise) sewage installations.

According to a ninth aspect of the invention, there is provided an method of analysing flow through a fluid conduit, the fluid conduit comprising a wall having an inner surface surrounding a flow space through which the fluid flows and an outer surface, the method comprising:
  measuring a first temperature being the temperature of the outer surface;
  measuring a second temperature being the ambient temperature outside of the fluid conduit; and
  categorising temporal subsets of the temperature data as, for each temporal subset:
    stable convergence if a difference between the first and second temperatures over the temporal subset is less than a first convergence threshold and the difference is stable over the temporal subset within a stability threshold;
    stable non-convergence if the difference is stable over the temporal subset within the first stability threshold, but the difference is greater than the convergence threshold;
    usage if at least one of the following criteria is met:
      the first temperature is changing rapidly within the temporal subset away from the second temperature; and
      the first temperature diverging from the second temperature so that the first temperature crosses a usage threshold;
    predicted convergence if a model of the first temperature over the temporal subset indicates that the first and second temperatures would converge to within a second convergence threshold; and
    predicted non-convergence if the model indicates that the difference first and second temperatures would stabilise at a value larger than the second convergence threshold;
  in which stable convergence and predicted non-convergence indicate no flow in the conduit, and usage, stable non-convergence and predicted non-convergence indicate flow in the conduit.

As such, this approach to analysing flow in the conduit allows for speedy consideration of whether the pipe and ambient (first and second) temperatures are converging; it combines a determination of what is occurring in the time period (temporal subset) if an immediate determination can be made (the non-predicted categories) with a prediction based on what the temperatures are currently doing. As such, the combination of predicted and non-predicted categories allow for more datasets to be categorised (as the predicted categories can categories temporal subsets that would not be categorisable by the non-predicted categories) but allowing for the simplicity of calculation involved with the non-predicted categories. Typically, a categorisation of usage will indicate a higher flow rate in the conduit than the stable or predicted non-convergence.

The method may comprise only calculating the model for a given temporal subset if the temporal subset is not categorised as stable convergence, stable non-convergence or usage. Thus, the more complicated calculations need only be carried out if the simple non-predicted categories do not successfully categorise the temporal subset.

The processor may be arranged to determine that the first temperature is changing rapidly within the temporal subset away from the second temperature if the rate at which the first temperature is changing is greater than a divergence threshold. The divergence threshold may be a predetermined value, or the processor may be arranged to determine the divergence threshold as a proportion of the span between a lowest observed temperature over an observation window and the second temperature. The processor may be arranged to determine a flow level by determining the rate of change of the first temperature away from the second temperature as a proportion of the span.

The method may comprise determining a fluid temperature. Typically, this would be the lowest first temperature recorded over a window period. Typically, the window period could be at least 12, but preferably at least 18 or 24 hours. The method may comprise determining the usage threshold as the fluid temperature shifted by a temperature shift towards the pipe temperature. As such, in effect, usage is determined on the usage threshold basis if the pipe temperature is within the temperature shift of the fluid temperature.

The method may be such that, if a temporal subset is determined as usage, it cannot also be determined as any other category.

The method may comprise modelling the first temperature by modelling the rate of change of the first temperature with time; as such, the rate of change of the first temperature may comprise a first component which is proportional to the difference between the first and second temperatures and has a first proportionality constant, and a second component which is proportional to the difference between the first temperature and a fluid temperature, being the temperature of a fluid in the fluid conduit, and has a second proportionality constant. The processor may also be arranged so as to model the first temperature by determining the first and second proportionality constants so that the modelled rate of change fits the measured first temperature over the temporal subset.

The first proportionality constant may represent characteristics of the installation of the apparatus and so may be unlikely to vary; the second proportionality constant may vary depending on the level of flow through the conduit. The method may comprise categorising each temporal subset based upon a ratio of the first and second proportionality constants; the smaller the second proportionality constant is relative to the first proportionality constant, the lower the flow. Typically, the processor may be arranged to categorise a temporal subset as predicted convergence if the ratio is above a gain threshold.

The method may comprise determining the goodness of fit of the model to the temperature data in each temporal subset. The method may only categorise a temporal subset as predicted convergence or predicted non-convergence if the goodness of fit is greater than a fitness threshold. If it is not, and the temporal subset is not otherwise categorised, the method may comprise categorising the temporal subset as undetermined.

We have found that the above method gives good results even when actual convergence is not seen, and can give useful results more quickly. In particular, it is useful in cases where the first temperature converges to a temperature between the first second and fluid temperatures; this is indicative of a flow, but where the first and second components are equal.

There now follows, by way of example only, description of embodiments of the invention, described with reference to the accompanying drawings in which.

Figure 1:
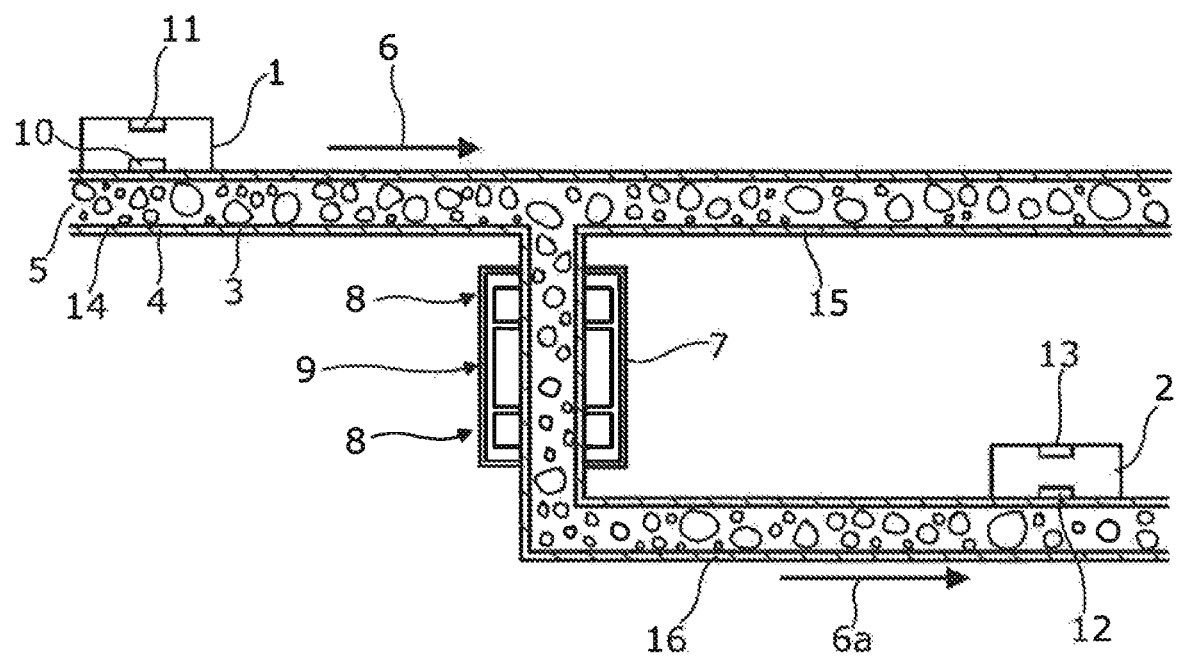
FIG. 1 shows a schematic view of a plumbing network having a flow determination apparatus in accordance with an embodiment of the invention.
Figure 2:
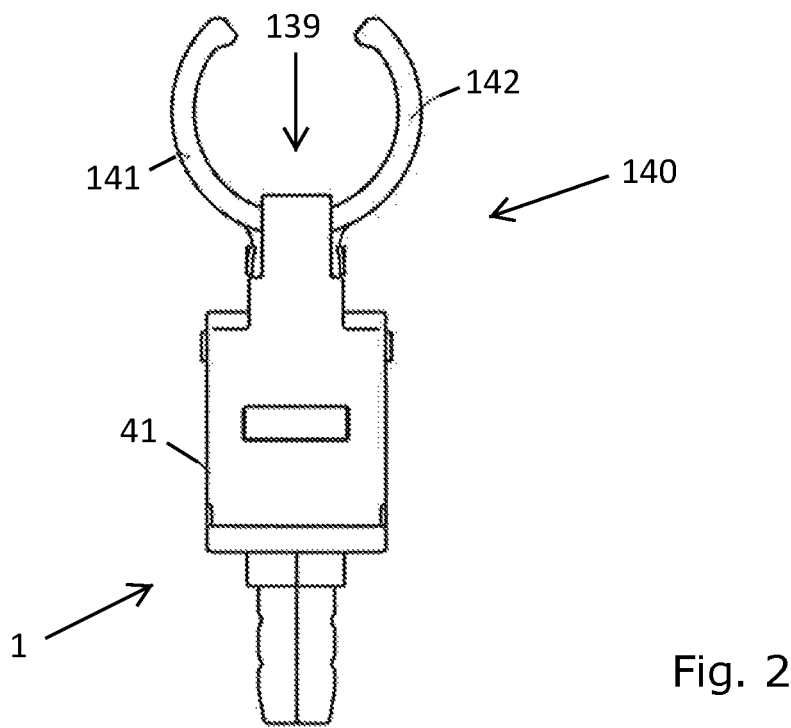
FIGS. 2 and 3 shows side views of the housing of the flow determination apparatus of FIG. 1.
Figure 3:
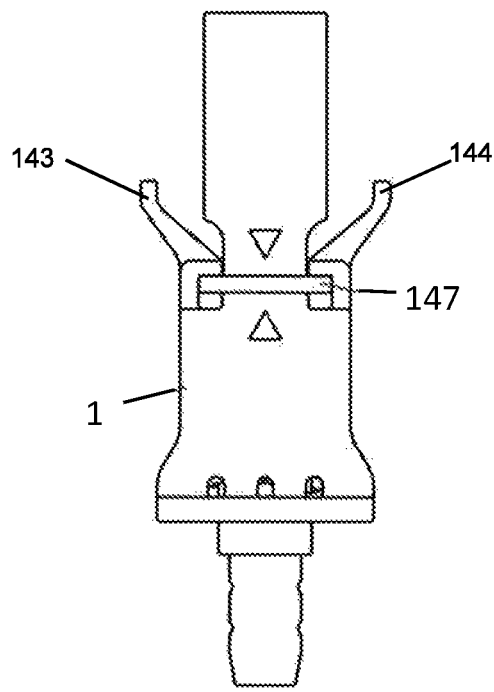
Figure 4:
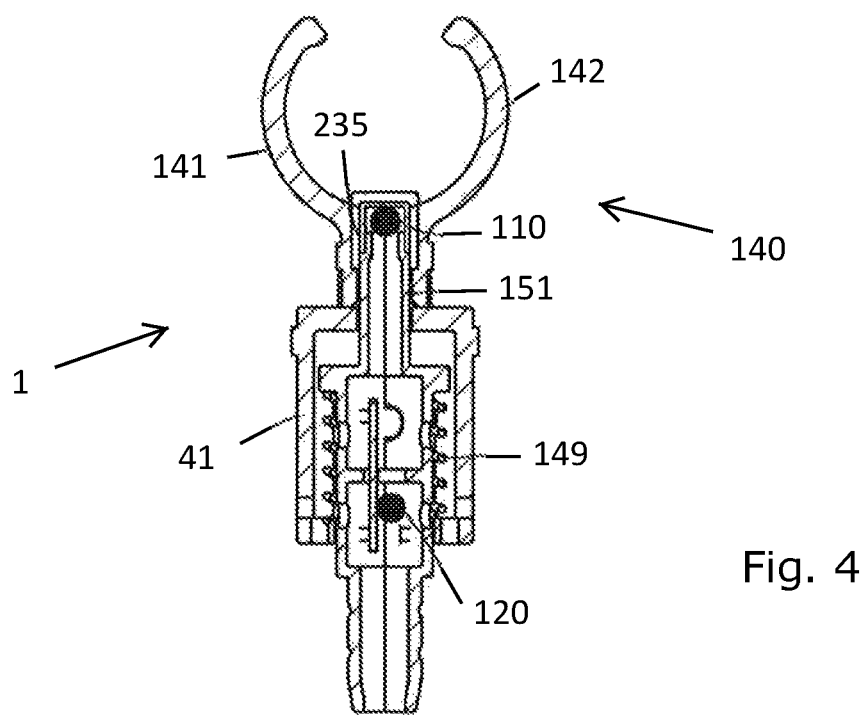
FIG. 4 shows a cross section through the apparatus of FIG. 2.
Figure 5:
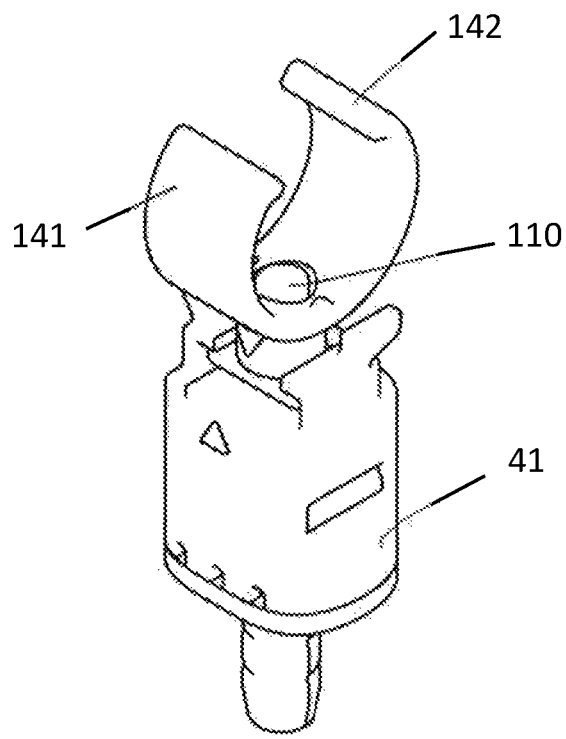
FIG. 5 shows a perspective view of the apparatus of FIG. 2.

A fresh water plumbing network for a domestic dwelling is shown schematically in FIG. 1 of the accompanying drawings. In this embodiment, a single supply pipe 14 enters the dwelling and branches into multiple branches 15, 16. Herein, we refer generically to the pipe 14, 15, 16 as 4, the pipe being a form of fluid conduit carrying clean water 5, a fluid. Arrow 6 shows the flow direction of fluid in pipes 14 and 15 and arrow 6a shows the direction of flow in pipe 16.

In order to make a flow determination—typically to determine whether there is a leak from the plumbing network—a flow determination apparatus is used. This comprises multiple housings 1, 2 at different locations on the plumbing network, and a remote processor.

The size of the divergence of the temperature of the water (and hence the pipe) on the one hand and the ambient temperature may be less when far into the plumbing network. As such, for the branches 16 deeper into the network, a heating/cooling apparatus 7 can be provided which selectively provides heating 9 or cooling 8 to the pipe 16 and hence the fluid, so as to increase the divergence in temperature when water flows. Typically, the heater 9 would be provided to heat the fluid, with smaller coolers 8 to cool preferentially the pipe 16 so that heat from the heater 9 does not propagate down the pipe rather than through the water.

The housings 1, 2 are identical. A main housing 1 is provided on the main supply pipe 14, whereas an auxiliary housing 2 can be provided on each branch 15, 16. The housings 1, 2 are described in more detail using the example of the main housing 1 with reference to FIGS. 2 to 6.

In these Figures, it can be seen that the housing 1 houses first 110 and second 120 temperature sensors (these may correspond to first temperature sensors 10/12 and second temperature sensors 11/13 of housings 1/2 in FIG. 1). The first temperature sensor 110 is to measure the temperature of pipe 4, whereas the second temperature sensor 120 measures the local ambient temperature. A sensor head 140 is also provided. This has a through bore 151 into which the first temperature sensor 110 can be inserted, and a bayonet coupling 147 which can be engaged by a corresponding locking collar of the first temperature sensor, so as to lock the first temperature sensor 110 into the sensor head 140.

The sensor head also comprises a pair of slightly elastic arcuate jaws 141, 142. These can be forced over a suitably-sized pipe 4, but will retain the pipe thereafter.

The sensor head 140 further comprises a pair of outriggers 143, 144. The outriggers 143, 144 may prevent the sensor head 140 from levering off the pipe when the sensor head 140 is pulled.

Figure 6:
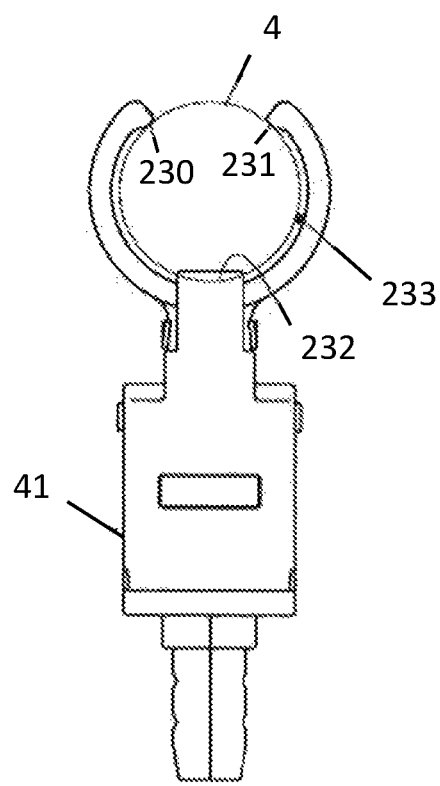
FIG. 6 shows side view of the apparatus of FIG. 2, coupled to a pipe.

The first temperature sensor 110, when installed in the sensor head 140 will protrude slightly from bore 151 so as to define a contact face 139 for the sensor head. The jaws can surround the pipe 4 (as shown in FIG. 6 of the accompanying drawings) but only contact at three contact portions 230, 231, 232. This means that an air gap 233 is defined between the pipe 4 and the jaws 141, 142, thus thermally isolating the jaws 141, 142 from the pipe 4, but with the first temperature sensor in contact with the pipe. An air gap 235 is defined between the first temperature sensor 110 and the bore 151 so as thermally isolate the first temperature sensor from the sensor head 140.

The first temperature sensor 110 is provided with a biasing spring 149, which biases it out of the bore 147, into contact with a pipe between the jaws 141, 142.

Figure 7:
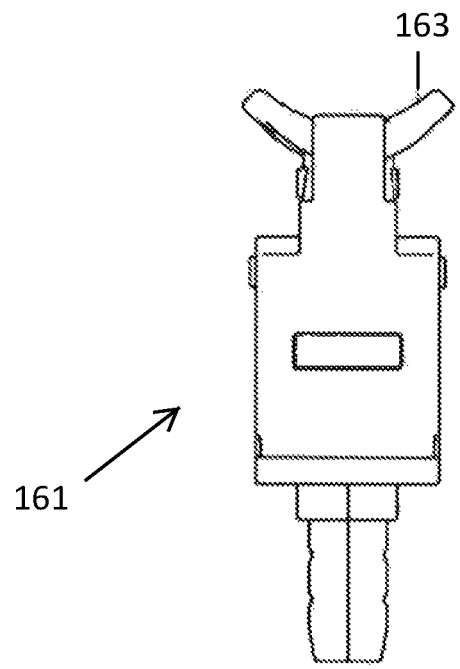
FIGS. 7 and 8 show side and perspective views respectively of an alternative sensor head of the sensing apparatus of FIG. 2.
Figure 8:
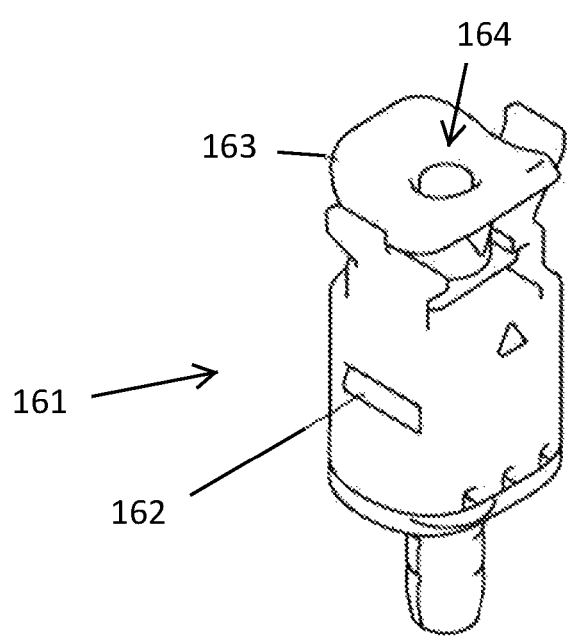

An alternative sensor head 161 is shown in FIGS. 7 and 8 of the accompanying drawings. This again has a through bore 164 for the first temperature sensor 110, provided with the same bayonet coupling 162 as for the sensor head 140 of FIGS. 2 to 6. However, rather than having jaws, it has a simple arcuate surface 163. This is useful for pipes that are larger than the jaws can fit, or which are irregularly shaped or otherwise inconvenient. The sensor head can then be attached to the pipe by means of adhesive tape, or by using tie wraps. It will still only provide three points of contact circumferentially about the pipe.

It can be seen that the installer of the sensor head can be provided with multiple different sensor heads, such as different sized versions of the sensor head 140 shown in FIGS. 2 to 6 as well as that of FIGS. 7 to 8. They can then choose which is most appropriate to the installation at hand, couple that to the first temperature sensor 110 and attach it to a pipe or other fluid conduit.

In both cases, a housing 41 depending from the sensor head 140 houses the second temperature sensor 120. Because the pipe is thermally insulated from the sensor head, there is little danger of the temperature of the pipe 4 affecting the ambient temperature which is measured by the second temperature sensor.

Each housing is also provided with a transmitter—such as a Bluetooth® Low Energy transmitter—which can carry out some processing and transmits data to the remote processor. Each housing is also provided with a power source (not shown), such as a battery, to power the transmitter and the temperature sensors.

The data collected by the sensors shown in FIGS. 2 to 8 of the accompanying drawings can be used to demonstrate how a flow determination can be made with this apparatus.

The apparatus relies on the fact that, if there is no flow in the pipe 4, then the temperature of the pipe—sensed by the first temperature sensor 110 will converge with the ambient temperature—sensed by the second temperature sensor 120 following a predictable curve.

When there is a substantial flow, the temperature of the pipe 4 will typically diverge substantially from the ambient temperature. This is most notable in domestic plumbing networks the closer to the point of entry of the supply pipe 14 into the premises. This is because the temperature of the fluid flowing through the pipe 4—here, water—is likely to be different to the ambient temperature. In the domestic plumbing context, this is because pipes external to the dwelling are buried in the ground. In temperate climates such as the United Kingdom, it is likely that the water flowing into a dwelling will be significantly lower than ambient temperature and this explanation will be based on that assumption, although this embodiment will function well also with water significantly above ambient (for example, in an air-conditioned home in a hot climate).

This means that, in the example of a temperate climate, a substantial flow will lead to a sudden drop in temperature of the fluid flowing through the pipe 4 and so a drop in the temperature of the pipe 4 itself.

Where there is a low flow, the temperature of the fluid in the pipe 4 and so the pipe 4 itself will still move towards ambient temperature. We have appreciated that the curve with which the temperature moves towards the ambient temperature with time is different from that when there is no flow, and that this can be used to determine whether there is any flow and to estimate the level of that flow.

Figure 9:
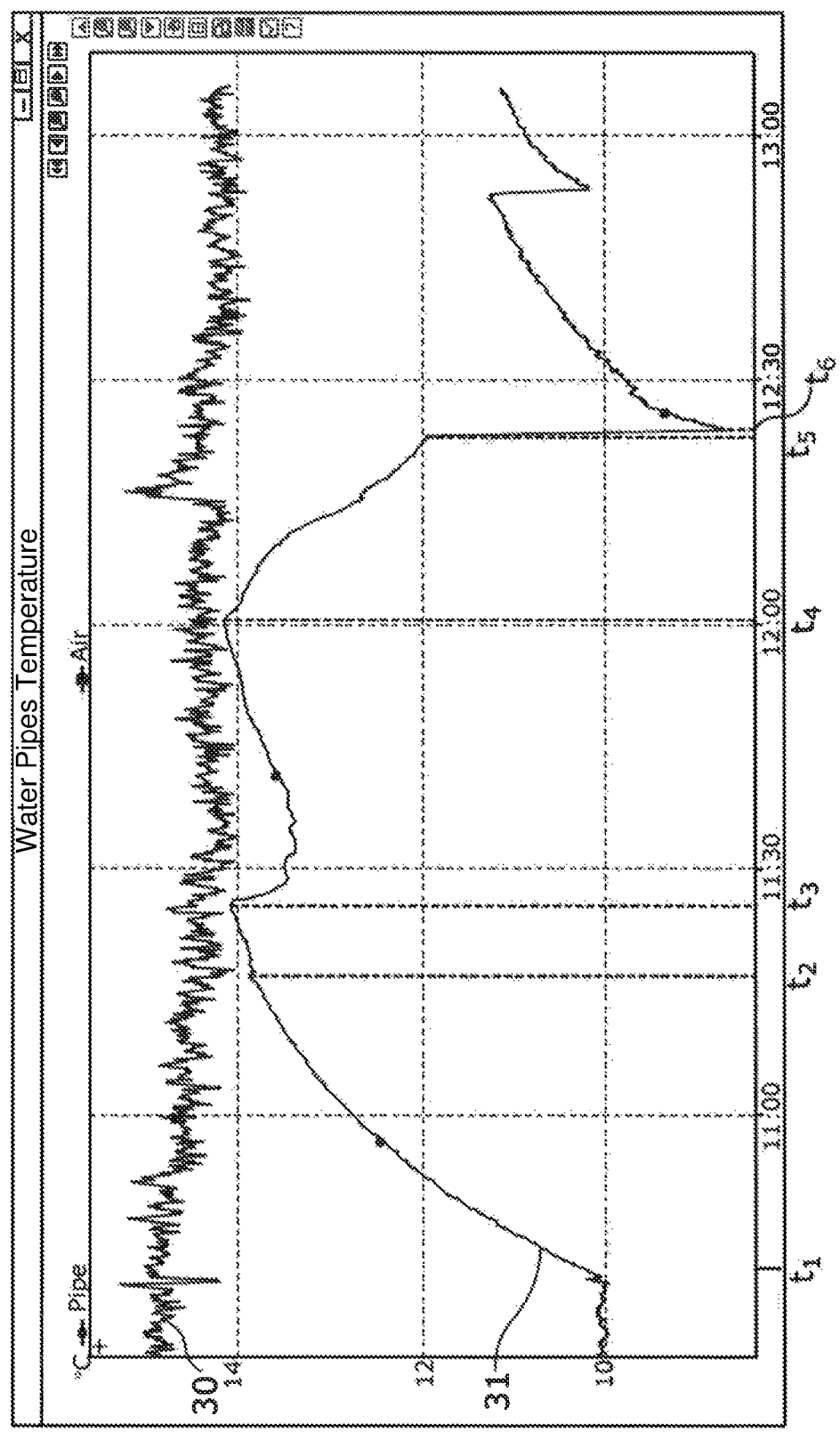
FIG. 9 shows a graph of data collected by the sensors of the flow determination apparatus of FIG. 1.

This can be demonstrated by considering FIG. 9 of the accompanying drawings. This shows measured data from a domestic dwelling, from the main housing 1. Trace 30 shows the ambient temperature as measured by the second temperature sensor 120 and trace 31 shows the pipe temperature as measured by the first temperature sensor 110, both plotted against time (shown in 24 hour clock).

In this example, at time $t_1$, the water through the dwelling was switched off; thus it was known that there was no flow. It can be seen that the trace 31 followed a particular curve between time $t_1$ and a later time $t_2$. This can be used to generate an expected convergence curve (or one can be calculated depending on the size and material of the pipe using standard fluid thermodynamic techniques). At time $t_3$ the water supply was restored to the dwelling and a small amount of divergence is seen as there is some flow to repressurise the plumbing system.

Subsequent to time $t_3$, it can be seen that there is some convergence with the ambient temperature 30. However, at time $t_4$, a toilet which had previously been disabled was reconnected, which had a leaking cistern. This had a leak of approximately 0.06 ml/second. This caused a substantial divergence from the ambient temperature until time $t_5$ when a tap was used, causing a substantial flow and a sudden divergence from the ambient temperature until time $t_6$.

At this point, the pipe temperature 31 begins to converge once more with the ambient temperature 30, but it can be seen that the convergence is slower than the curve between times $t_1$ and $t_2$. This is indicative of a small flow. In this example, the flow turned out to be another toilet that had a then undiagnosed leak.

As such, in order to determine whether there is flow, the apparatus can measure the first and second temperatures at a first time $t_0$. At that point, it can predict what the first temperature will be at a later time $t_1$. Typically, this could be using the predictive convergence curve, or a simple exponential heating curve. At that later time $t_1$, the first temperature can be measured again, and a comparison of prediction and actual measurements taken. Given that the prediction indicates no flow, if the actual measurement is further from the ambient temperature (in this case, colder) than the prediction, then there is some flow, and the larger the difference between prediction and actual flow can indicate the size of the flow. This can be repeated at intervals as required.

FIG. 9 shows temperature profiles from a system using cold water. However, the method of determining flow also works for hot water, i.e. water at a temperature above the ambient temperature. In this case, flow of water would cause the pipe temperature (as measured by first temperature sensor 110) to rise above the ambient temperature. In the absence of flow the pipe temperature would fall to converge with the ambient temperature. The difference between an expected convergence with ambient temperature and a measured convergence can be used to determine flow in the pipe using the same method as described above.

As such, it can be seen that a binary determination of whether there is flow can be made based upon a determination of whether the prediction is correct. An indication of the level of flow can be made by determining the difference between the actual and expected convergence; the larger the difference, the higher the flow.

In one embodiment, in order to determine whether there is any flow, a series of categorisations can be made for each batch of data. The categories determined are:
  Usage
  Stable non-convergence (low rate usage)
  Stable convergence (zero flow)
  Predicted non-convergence (low rate usage)
  Predicted convergence (zero flow)
  Undetermined The current embodiment samples the first and second temperatures every 10 seconds, but finer or coarser sampling is possible.

Though the water temperature itself is not measured directly, it can be inferred by looking at the lowest point reached by the pipe wall temperature over a recent period that includes activity. Water supply temperature is very stable so in a scenario where there has been activity in the last (say) 24 hours it is a very good assumption that the lowest pipe wall temperature seen in the last 24 hours is the water supply temperature. This is not a quantity that is reported to the user but it is used as explained below.
  Usage
  There are broadly two symptoms of usage
  Rapid fall in pipe temperature
  Pipe temperature remaining at or near water supply temperature If a single pipe temperature reading is lower than the previous by an amount greater than or equal to a threshold (in this embodiment 0.3° C.) then the status for that moment is defined as "Usage".

If over a set of readings (in this embodiment, 5) a drop of at least a further threshold (in this embodiment, 0.4°) is seen, that is usage.

Any reading directly after a usage reading where the value is still falling or level is regarded as a continuation of the usage.

If a single reading that would otherwise not be usage is sandwiched between two which are, this can optionally be regarded as usage.

Any reading which is level or falling and is within a threshold, in this embodiment, 1 degree C., of the water supply temperature may be regarded as usage.

Furthermore, it is possible to determine the span between the lowest temperature recorded in the last, say, 24 hours and then look at a temperature change of a given proportion of the span as indicating a usage event. The rate of change as a proportion of the span can be used to indicate the size of the usage event, either numerically or as categories (e.g. small/medium/large).
  Stable Convergence Stable convergence indicates that there is no flow in the pipe.

In this embodiment, it is defined as follows:
  A rolling average of, in this embodiment, 5 temperature readings is taken.
  When the difference between the rolling average and the current pipe temperature is stable and is equal or less than a threshold, in this embodiment, 0.3 degrees C. this is "stable convergence".
  "Stable" means that a number of readings (in this embodiment 30) the difference does not vary more than a margin (in this embodiment, 0.2° C.).

So based on these values, if the difference between pipe temperature and rolling average of ambient temperature stayed between 0.1 and 0.3° C., or between 0 and 0.2° C., for 5 minutes, that would be regarded as stable convergence.

Note that the pipe and air temperature might be tracking up or down in this period, but it is the difference that is considered.
Stable Non-Convergence Stable non convergence indicates that there is some flow in the pipe.

It is defined as follows:
  A rolling average of in this embodiment 5 temperature readings is taken.
  When the difference between the rolling average and the current pipe temperature is stable and is greater than the threshold (0.3 degrees C. in this embodiment), this is "stable non-convergence"
  "Stable" means that a number of readings (in this embodiment 30) the difference does not vary more than a margin (in this embodiment, 0.2° C.).

So these would count as stable non convergence:
  5 minutes where the pipe temperature and the rolling average ambient temperature differed between 0.4 and 0.6 degrees.
  5 minutes where the pipe temperature and the rolling average ambient temperature differed between 10 and 10.2 degrees.

There are potentially scenarios that qualify both as usage and non-convergence. The test for usage should be applied first. If a situation qualifies as usage we don't bother looking for other designations.
Prediction The prediction categories are needed where, for example, in some properties convergence might take 3 hours but usage occurs every 2 hours and so convergence is never given a chance to complete. In these cases, prediction comes into play.
  Theory In the model used, the rate of change of temperature of the pipe 4 is modelled. In this model, the change of temperature in one time interval—the time over which the algorithm is used—is given by:

$$\Delta T = \text{HeatGain}(T_{ambient} - T_{pipe}) - \text{FlowGain}(T_{pipe} - T_{supply})$$

where $T_{ambient}$ is the ambient temperature measured by the second temperature sensor, $T_{pipe}$ is the temperature of the pipe wall as measured by the first temperature sensor, $T_{supply}$ is the temperature of the water in the pipe at the supply (which can be determined as the lowest pipe wall temperature reached, as that is the temperature that the pipe wall will reach after sustained flow).

If there is no flow at all, flow gain=0. Where there is full flow usage, flow gain is very large.

Heat gain, on the other hand, does not vary over time within a given installation. Once the optimum value has been found it should vary very little over time and so the previous value is likely to be a good starting point in any optimisation.

If flow gain=heat gain, we might expect to see the pipe temperature stabilise exactly halfway between the water supply temperature and the ambient temperature. We might call this a gain ratio of 1.

In a typical situation where ambient ~20° C. and pipe ~10° C., if the pipe temperature were to stabilise at 0.4 degrees below ambient, that would mean that the ratio of heat gain to flow gain (the gain ratio) was 24.

Put another way, our "temperature difference" criteria for drawing the line between actual convergence and actual non-convergence discussed above equates to a gain ratio of above 24 for predicted convergence.

Given a sequence of data where the temperatures are starting to converging, but will not achieve convergence before something else happens, the idea with prediction is to see what values of heat gain and flow gain, would, if used in an appropriate model, produce a trace most like that seen in the actual data. If values can be found which create a model that closely mirrors the actual data, the two gain values may be close to the reality.

Practice

Throughout the data set, there are patches of data that cannot be categorised as being any of the other designations. Once an unbroken run of un-categorisable data (meaning it does not satisfy the criteria for usage, convergence or non-convergence) has been captured, which is at least a predetermined length (in this embodiment, 200 values) then a prediction is attempted. If there is a run of un-categorisable data but it is less than the length then it can be designated as "undetermined".

Multiple attempts to find a model that fits are attempted (an iterative optimisation). In each case, candidate values for FlowGain and HeatGain are used. The algorithm moves through 2 dimensional (HeatGain, FlowGain) space looking for the values that give the best fit.

Each cycle through the optimisation goes as follows:
Values for HeatGain and FlowGain are chosen, initially by using any previously determined value.
A curve for "predicted pipe temperature" is generated alongside the actual pipe temperature curve, as follows
The first value of the predicted pipe temperature curve is the same as the actual pipe temperature curve.
Thereafter each subsequent value of the predicted curve is worked out as follows:

$$T_{pipe(predicted)}(n) = T_{pipe(predicted)}(n-1) + \text{increment}(n-1)$$

Where "increment"=HeatGain×$(T_{ambient} - T_{pipe(predicted)})$ − FlowGain×$(T_{pipe(predicted)} - T_{supplyTemp})$.

Thus for each data point in the set being analysed, a predicted pipe temperature will be generated.

By the end of this exercise there will be a set "predicted pipe temperature" readings corresponding to the "actual" pipe readings. If the two data sets correspond closely, the model is a good fit, which means the values of HeatGain and FlowGain are broadly representative of what is going on in reality. The method compares the two arrays of points with a "root mean square difference" assessment, looking at the mean deviation of theoretical from actual.

$$\text{Deviation} = \sqrt{\frac{1}{n}\sum_{k=0}^{n}(T_{pipeactual}(k) - T_{pipepredicted}(k))^2}$$

The optimisation process in effect hunts around in (HeatGain, FlowGain) space until it runs out of allotted attempts of finds values for which the model fits the actual data closely enough.

The current algorithm optimises using binary sections on one of the gains at a time. So we might pick a midrange value for HeatGain, and hold it constant while we optimise by varying FlowGain. Then we fix the FlowGain (with whatever value the last optimisation gave us) and optimises for HeatGain. This is repeated a maximum number of times.

For each of the gains in turn, the binary section method is as follows:
Start with min and max possible values of gain (a and b) based on the possible range then
Pick the midpoint x:x=(a+b)/2
Pick a small value e and evaluate the model deviation at x−e and at x+e
If
the variance at (x−e)<variance at (x+e) then b=x+e
Otherwise
a=x−e
Repeat for the chosen number of cycles
Using the Output of the Prediction
For a given block of data, the output of the prediction (when the optimisation has gone as far as it can) will be
A flow gain
A heat gain
A measure of how well the model (the best case one that was found) fits the actual data.
If the measure of model quality is as shown above (i.e. minimising the value of "root mean squared deviation from the actual data") then the measure will be in units of a degree. A fit of 0.1° C. has proved possible on a typical data set when the region of data does represent something looking like convergence.
Therefore, in this embodiment, the rule for interpreting a prediction is as follows
if the best model we can find has a deviation greater than a threshold (in this embodiment 0.1° C.) then we consider the model not to be a good match. Each of the points in the chunk of data should be designated as "undetermined"
If on the other hand the deviation is less than the threshold then we regard this as a match.
If the gain ratio (HeatGain/FlowGain) is more than a threshold, say 25, then we regard that as "predicted convergence".
Otherwise it is "predicted non convergence".
Combining all of the Algorithm Data into Output
By the time a complete data set has been analysed, every data point will be designated as either
Usage
Stable non-convergence (low rate usage)
Stable convergence (zero flow)
Predicted non-convergence
Predicted convergence
Undetermined
Events It is then possible to list all of the "usage events". A usage event is simply a continuous unbroken sequence of points designated as "usage". It has a start time and a duration. For example, if there are 3 consecutive data points that is regarded as 30 seconds duration.

An event may qualify as an alert if it meets certain criteria. The criteria are user determined. For the engineering application we will only offer a single alert setting, "usage exceeding a set duration". Alerts generate notifications until acknowledged).

Leaks

The output with respect to leaks is, in this embodiment, based on the last 24 hours.

If there has been actual stable convergence in the last 24 hours, then the property is regarded as leak free.

If there has not been convergence but there has been stable non-convergence, then the property is regarded as having a leak. The magnitude of the non-convergence is a measure of the severity of the leak.

If neither of the above is true, then the assessment must be based on any well matched predictions in the last 24 hrs. If there is a prediction of convergence, it takes precedence over a prediction of non-convergence.

Thus, looking at FIG. 9 of the accompanying drawings, the method above would classify the various time periods as follows:

$t_1$ to $t_2$: Predicted convergence
$t_2$ to $t_3$: Stable convergence
$t_3$ to $t_4$: Undetermined
$t_4$ to $t_6$: Usage
$t_6$ onwards: Predicted non-convergence It will be understood that the present invention has been described above purely by way of example, and modification of detail can be made within the scope of the invention.

The invention claimed is:

1. An apparatus for making a flow determination with respect to a flow through a fluid conduit, the fluid conduit comprising a wall having an inner surface surrounding a flow space through which the fluid flows and an outer surface, the apparatus comprising:
a first temperature sensor arranged to be mounted on the outer surface of the fluid conduit and arranged to generate a first temperature signal indicative of a first temperature being the temperature of the outer surface;
a second temperature sensor arranged to be positioned spaced apart from the first temperature sensor and to generate a second temperature signal indicative of a second temperature being the ambient temperature outside of the fluid conduit; and
a processor having inputs for the first and second temperature signals;
in which the processor has an output for the flow determination and is arranged to make the flow determination by:
determining the first and second temperatures at a first time;
using the first and second temperatures at the first time, predicting a predicted first temperature representative of the first temperature at a second time later than the first time;
determining the first temperature at the second time;
comparing the predicted first temperature with the determined first temperature at the second time; and
making the flow determination dependent upon the comparison.

2. An apparatus according to claim 1, wherein the processor is arranged to compare the predicted first temperature with the determined first temperature by determining whether the determined first temperature at the second time is at least one of:
closer to the second temperature than the predicted first temperature,
further from the second temperature than the predicted first temperature, or
equal to the predicted first temperature.

3. An apparatus according to claim 1, wherein the predicted first temperature represents a zero flow state.

4. An apparatus according to claim 1, wherein the processor is arranged to determine the magnitude of the difference between the predicted first temperature and the determined first temperature, and wherein the processor is arranged to determine the level of flow based on the determined magnitude of the difference between the predicted first temperature and the determined first temperature.

5. An apparatus according to claim 1, further comprising a memory configured to hold a plurality of expected convergence curves relating to fluid conduits of different sizes and materials.

6. An apparatus according to claim 5, wherein each expected convergence curve corresponds to a model which assumes no flow in the fluid conduit.

7. An apparatus according to claim 5, wherein each expected convergence curve corresponds to a model which assumes that the difference between the first and second temperatures will decay exponentially, or a numerical approximation to an exponential decay.

8. An apparatus according to claim 5, wherein the processor is arranged to determine the expected convergence curve and to store it in the memory by recording the temperature of the fluid conduit over a period of time when there is known to be no flow, but that starts at a point where the temperature of the fluid conduit and the ambient temperature is different.

9. An apparatus according to claim 1, wherein predicting a predicted first temperature representative of the first temperature at a second time later than the first time is performed under an assumption of a zero flow state, wherein the first temperature converges with the ambient temperature following a predictable curve.

10. An apparatus according to claim 1, wherein the second time is before stable convergence of the first and second temperatures.

11. An apparatus according to claim 1, wherein making the flow determination comprises categorizing the flow as one of usage, stable convergence, stable non-convergence, predicted convergence, predicted non-convergence or undetermined.

12. A method of making a flow determination with respect to a flow through a fluid conduit, the fluid conduit comprising a wall having an inner surface surrounding a flow space through which the fluid flows and an outer surface, the method comprising:
measuring, at a first time, a first temperature being the temperature of the outer surface;
measuring, at the first time, a second temperature being the ambient temperature outside of the fluid conduit;
using the first and second temperatures at the first time, predicting a predicted first temperature representative of the first temperature at a second time later than the first time;
measuring the first temperature at the second time;
comparing the predicted first temperature with the measured first temperature at the second time; and making the flow determination dependent upon the comparison.

13. A method according to claim 12, wherein comparing the predicted first temperature with the determined first temperature at the second time comprises determining whether the determined first temperature at the second time is at least one of:
- closer to the second temperature than the predicted first temperature,
- further from the second temperature than the predicted first temperature, or
- equal to the predicted first temperature.

14. A method according to claim 12, further comprising determining the magnitude of the difference between the predicted first temperature and the determined first temperature, wherein the magnitude of the difference between the predicted first temperature and the determined first temperature is used to determine the level of flow.

15. A sensing apparatus, comprising:
- a first temperature sensor;
- a sensor head housing the first temperature sensor, the sensor head being arranged so as to hold the first temperature sensor against a fluid conduit, with the first temperature sensor being arranged so as to produce in use a first temperature signal indicative of a first temperature being that of the fluid conduit, wherein the first temperature sensor is provided with a sensor biasing member, which tends to bias the first temperature sensor into contact with the fluid conduit in use;
- a second temperature sensor, arranged to produce in use a second temperature signal indicative of a second temperature being the ambient temperature;
- in which the sensor head comprises a engagement portion arranged to engage the fluid conduit to retain the fluid conduit, in which the engagement portion has three contact positions circumferentially around the fluid conduit and does not otherwise contact the fluid conduit.

16. A sensing apparatus according to claim 15, wherein the engagement portion comprises a biasing member arranged to bias at least one of the contact positions into contact with the fluid conduit.

17. A sensing apparatus according to claim 15, having an air gap between the engagement portion and/or the sensor head on the one hand, and the first temperature sensor on the other hand.

18. A sensing apparatus according to claim 15, wherein the first temperature sensor is mounted in the sensor head using a coupling which can be repeatedly released and engaged.

19. A kit of parts comprising a sensing apparatus according to claim 18 and a plurality of interchangeable sensor heads.

20. A fluid conduit having a circumference fitted with the apparatus of claim 15, wherein the apparatus only contacts the fluid conduit at the contact positions.

* * * * *